United States Patent [19]

Morris et al.

[11] Patent Number: 5,412,011
[45] Date of Patent: May 2, 1995

[54] COMPOSITION AND PROCESS FOR COATING METALS

[75] Inventors: Brenda S. Morris, Philadelphia; Jiangbo Ouyang, Bensalem; David W. Reichgott, Richboro, all of Pa.

[73] Assignee: Betz Laboratories, Inc., Trevose, Pa.

[21] Appl. No.: 137,644

[22] Filed: Oct. 15, 1993

[51] Int. Cl.$^6$ ............ C08L 33/26; C08L 33/02; C08K 3/34; C08K 5/54
[52] U.S. Cl. ............ 524/261; 524/442; 524/444; 524/555; 524/556; 427/421; 427/409; 427/428; 525/329.4; 525/329.9
[58] Field of Search ........... 524/555, 556, 492, 493, 524/538, 442, 261, 262, 444; 427/409, 421, 428; 525/329.4, 329.9

[56] References Cited

U.S. PATENT DOCUMENTS

| | | | |
|---|---|---|---|
| 4,330,446 | 5/1982 | Miyosawa | 524/555 |
| 4,407,899 | 10/1983 | Hara et al. | 428/626 |
| 5,108,793 | 4/1992 | van Ooij et al. | 427/327 |
| 5,122,202 | 6/1992 | Dykstra et al. | 148/247 |
| 5,281,468 | 1/1994 | Klier et al. | 427/409 |

Primary Examiner—James J. Seidleck
Assistant Examiner—Mark L. Warzel
Attorney, Agent, or Firm—Alexander D. Ricci; Steven D. Boyd; Gregory M. Hill

[57] ABSTRACT

A non-chromium conversion coating for metal surfaces such as aluminum, steel, galvanized steel and zinc-aluminum steel consisting of an aqueous solution of an anionic polyacrylamide copolymer, an inorganic silicate and an organofunctional silane.

18 Claims, No Drawings

COMPOSITION AND PROCESS FOR COATING METALS

FIELD OF THE INVENTION

The present invention relates to a coating for metals which improves the corrosion resistance and adhesion properties of the metal's surface. Specifically, the present invention relates to a single non-chromium treatment that is equally effective on many different metal surfaces. Such metals include aluminum, steel, zinc coated steel and zinc-aluminum coated steel.

BACKGROUND OF THE INVENTION

The purposes of conversion coatings on metal surfaces are to provide corrosion resistance and improve the adhesion of coatings. The conversion coating improves the adhesion of coating layers such as paints, inks, lacquers and plastics.

Traditionally, chromates have been utilized as conversion coating compounds. Chromates are known to exhibit acceptable performance on different types of metals or alloys, such as aluminum, steel, galvanized steel and zinc-aluminum coated steel. Chromate conversion coatings are typically administered by contacting the metal surface with an aqueous solution containing hexavalent or trivalent chromium ions, phosphate ions or fluoride ions. Serious concerns have been raised, however, regarding the pollution effects of the chromate or phosphate discharged into rivers or waterways by such processes. Due to the high solubility and the strongly oxidizing character of hexavalent chromium ions, conventional chromate conversion coating processes require extensive waste treatment procedures to control their discharge.

While many acceptable chromium-free conversion coatings have been developed, their utility is often limited to only one type of metal substrate. Many industrial operations, however, involve the sequential processing of different types of metals. Unless the undesirable chromium compounds are used, the industrial metal processor is forced to change the conversion coating bath for each different type of metal. This results in unacceptable downtime and higher processing costs.

It is desirable, therefore, to have a conversion coating compound which is equally effective on more than one type of metal. This is achieved by the composition of the present invention.

SUMMARY OF THE INVENTION

The present inventors have discovered a metal conversion coating which enhances the corrosion resistance and the adhesion properties of the surface of the metal. It provides excellent paint adhesion and corrosion resistance. The coating of the present invention is formed from an aqueous solution containing an anionic polyacrylamide copolymer, an inorganic silicate and an organofunctional silane.

DETAILED DESCRIPTION OF THE PREFERRED EMBODIMENT

It was discovered by the present inventors that a composition comprising anionic polyacrylamide copolymers, inorganic silicates and organofunctional silanes provide a non-chrome pre-treatment for various metallic surfaces.

The unique characteristics of the conversion coating composition of the present invention is that it forms an effective coating on the surfaces of metals such as aluminum, steel, zinc coated steel (galvanized) and zinc-aluminum coated steel (Galvalume ®).

The anionic polyacrylamide copolymer of the present invention contains monomeric repeat units of acrylic acid and acrylamide. The copolymer has an acrylate acrylamide molar ratio of from about 1/5 to 10/1 and a weight average molecular weight of from about 200 to 500,000. Preferably, the copolymer will have a molar ratio from about 1:1 to 9:1 and a number average molecular weight of from about 20,000 to 350,000.

The inorganic silicates are derived from either ortho- or condensed silicates. Water soluble salts of the following inorganic anions, in particular the sodium, potassium and ammonium salts there of, may be used in the practice of this invention. Such compounds are:

Metasilicate—$SiO_3^{2-}$
Orthosilicate—$SiO_4^{4-}$
Disilicate—$Si_2O_5^{-2}$
Mixed Silicates—$Na_2O \cdot xSiO_2$ (where x=1-5)
Aluminosilicates—$Na_2O \cdot xAl_2O_3 \cdot ySiO_2$ (where x+y=3-5)

The preferred inorganic silicates are alkaline metasilicates where the ratio of $SiO_2$ to $Na_2O$ is from about 2 to 1 about 1 to 1.

Such organofunctional silanes are hydrolyzed and are prepared from the respective alkoxysilanes where one or more alkoxide groups are converted to a silanol (Si—OH, or Si—O$^-$) function through acid or base hydrolysis. These may be prepared from a wide variety of organofunctional alkoxysilanes. The techniques are familiar to those practiced in the art and are readily available in the literature. See, for example, E. P. Pluddemann, "Silane Coupling Agents", 2nd. ed., Plenum Press, 1991, chapter 2, herein incorporated by reference.

The organofunctional silanes which are required in this invention are aminosilanes. The preferable aminosilane is a hydrolyzed aminopropyltrimethoxysilane. This compound is commercially available as an approximately 20% active aqueous solution from Huls America designated as Hydrosil 2627.

The three ingredients of the present invention are prepared in an aqueous solution. In an aqueous solution, the polyacrylamide copolymer is present from about 0.008% to about 0.2%, the inorganic silicate from about 0.005% to about 0.12% (expressed on a basis of $SiO_2$ weight), and the hydrolyzed organofunctional silane from about 0.01% to about 0.25%.

An aqueous concentrate may conveniently be prepared which upon dilution to about 1% to 10% gives aqueous solutions with the appropriate component concentrations. Such a concentrate is from about 0.8% to about 2% of the polyacrylamide copolymer, 0.5% to about 1.2% of the inorganic silicate (expressed on a basis of $SiO_2$ weight), and about 1.0% to about 2.5% of the hydrolyzed organofunctional silane.

For roll-coating methods of application, the solution may be formulated so that it contains approximately from 0.01 to 0.02 molar silicate. In applications where the solution is in contact with the substrate for a longer time, more dilute concentrations are preferred, i.e., 0.001 to 0.01 molar silicate. Of course, the other components in the pre-treatment composition are present in amounts corresponding to the solution percentages previously disclosed.

The present conversion coating solution is typically applied at room temperature. The workable pH for application is from about 5 to 13, preferably about pH 8-11. The active concentration of the active agents in the solution can range from about 0.02% to about 2%. Preferably, the concentration is about 0.05% to 0.75%.

The treatment solution may be applied to the metal surface to be treated by any conventional means such as spraying, applying by dip squeegee, flow coating, roll coating and the like. Roll coating is generally preferred. The treatment solution of the present invention is preferably dried in place although rinsing may be employed if desired.

EXAMPLES

The present invention will now be further described with reference to a number of specific examples which are to be regarded solely as illustrative and not as restricting the scope of the present invention.

Sample 1 was prepared as follows. An aqueous concentrate was made in deionized water by blending 1.25% of an acrylic acid/acrylamide copolymer (7/3 molar ratio; weight average molecular weight of 200,000; available from American Cyanamid as Cyanamer A-370), 1.6% of sodium metasilicate and 10% of Hydrosil 2627.

Sample 2 was prepared indentical to Sample 1, only the silane component was omitted.

In order to test the efficacy of the present invention the following conventional pre-treatment products were prepared. Comparative Example A consisted of an aqueous solution containing 0. 0125 Mol/l sodium silicate, 0.125% cationic polymer and 1% Hydrosil 2627. Comparative Example B consisted of a 15% solution of a commercial dried-in-place chromic acid based pretreatment. Comparative Example C consisted of 0.25 g/l of copolymer 2 of U.S. 5,158,662 with 1.2 g/l of dihydrohexafluorotitanic acid.

Example 1

The following test procedure was followed. Hot dipped galvanized steel panels were obtained from ACT Corp. They were spray cleaned with a hot alkaline surfactant solution in water, rinsed, passed through squeegee rolls to remove most of the water, and then spin-coated by flooding the panel surface with the solutions below. The wet panels were spun for 10 sec. after the solution was applied. The panels were dried in place on the spinner with a stream of hot air.

The panels were painted with an epoxy primer and then top-coated with a siliconized polyester.

The adhesion and corrosion performance of the treated and painted galvanized steel were evaluated using a Wedge Bend test and a 500 hour Neutral Salt Spray test, respectively. In the Wedge Bend test, a tapered 180 degree bend in the metal is formed by first turning it to a radius of about 0.5 cm and then flattening the metal to a near zero radius. The stressed surface is then subjected to a tape pull, and the amount of paint loss (in mm) is recorded. 0 mm is perfect. Neutral Salt Spray tests were carried out in accordance with ASTM B-117, with the scribe and rating methods following ASTM D-1654 Test Method B, Procedure A 7.2. The ratings are from 0 to 10 (10=perfect).

Table I shows the efficacy of the inventive conversion coating on galvanized steel.

TABLE I

| Solution | Wedge Bend Loss (mm) | 240 hr. Condensing Humidity Avg. Rating | 500 hr. Neutral Salt Spray Average Scribe Rating |
| --- | --- | --- | --- |
| 10% Sample 1 | 18 | 10.0 | 6.5 |
| Comparative Example A | 15 | 2.0 | 7.5 |
| Comparative Example B | 23 | 8.0 | 9.5 |

Example 2

Testing was then performed on aluminum (3003 alloy). Test conditions and procedures were similar to the previous example except as follows: a single coat polyester paint was used and acetic acid salt spray testing (ASTM B-287) was used in place of the neutral salt spray. Results are shown in Table II.

TABLE II

| Solution | Wedge Bend Loss (mm) | 240 hr. Condensing Humidity Avg. Rating | 500 hr. Acetic Acid Salt Spray Average Scribe Rating |
| --- | --- | --- | --- |
| 10% Sample 1 | 0 | 10.0 | 8.5 |
| Comparative Example A | 0 | 2.5 | 5.5 |
| Comparative Example B | 0 | 9.0 | 8.8 |

Example 3

The procedure of Example 2 was followed, only the solutions made from Sample 1 were diluted and spray applied at ambient temperature, for 10 seconds, and then dried. An additional performance test was to impact the aluminum on the reverse side of the test surface with 38 in-lb momentum, boil the test sample in deionized water for 20 minutes, and then subject the deformed area to a tape pull. Results were as follows:

TABLE III

| Solution | Wedge Bend Loss (mm) | Reverse Impact Boiling Water % Paint Loss | 240 Hour Condensing Humidity Avg. Rating | 500 hr. Acetic Acid Salt Spray Avg. Scribe Rating |
| --- | --- | --- | --- | --- |
| 1% Sample 1 | 12 | 70 | 7.0 | 7.5 |
| 2% Sample 1 | 15 | 15 | 7.5 | 7.3 |
| 4% Sample 1 | 15 | 15 | 2.0 | 5.3 |
| Comparative Example C | 27 | 100 | 6.0 | 6.0 |

Example 4

The procedure of Example 2 was followed, only the solutions made from Sample 2 were diluted and varying amounts of organofunctional silane were added. Three different polyester paint systems were tested. The acetic acid salt spray data indicated a minimum of about 0.06% silane was preferred. Results were as follows:

TABLE IV

| Solution | Organo-functional Silane (% active) | 500 hr Acetic Acid Salt Spray Avg. Ratings | | | | | |
| --- | --- | --- | --- | --- | --- | --- | --- |
| | | Paint A | | Paint B | | Paint C | |
| | | Scribe | Field | Scribe | Field | Scribe | Field |
| 7.5% Sample 2 | 0.03 | 7.5 | 5 | 8 | 5 | 7 | 8 |
| 7.5% Sample 2 | 0.06 | 9 | 9 | 9 | 8 | 8 | 9 |
| 7.5% Sample 2 | 0.09 | 9 | 9.5 | 9 | 9 | 8 | 8.5 |
| 7.5% Sample 2 | 0.12 | 9 | 10 | 9 | 8 | 8 | 9 |
| 7.5% Sample 2 | 0.15 | 8.5 | 10 | 9 | 8 | 9 | 9.5 |
| Comparative Example A | | 9 | 10 | 9 | 10 | 9 | 10 |

Example 5

The efficacy of the inventive conversion coating is now exhibited on Galvalume. Test conditions and procedures were identical to those described for the tests done on galvanized steel

TABLE V

| Solution | Wedge Bend Loss (mm) | 240 hr. Condensing Humidity Avg. Rating | 500 hr. Neutral Salt Spray | |
| --- | --- | --- | --- | --- |
| | | | Scribe Rating | Field Rating |
| 10% Sample 1 | 33 | 9.0 | 10 | 9 |
| Comparative Example A | 31 | 7.0 | 10 | 6 |
| Comparative Example B | 30 | 7.0 | 10 | 8 |

What is claimed is:

1. An aqueous solution for coating a metal surface comprising an anionic acrylamide acrylic acid copolymer, a water soluble inorganic silicate and an organofunctional silane.

2. The aqueous solution of claim 1 wherein the anionic acrylamide acrylic acid copolymer has a weight average molecular weight of from about 200 to 500,000.

3. The aqueous solution of claim 2 wherein the anionic acrylamide acrylic acid copolymer consists of acrylic acid and acrylamide monomers wherein the molar ratio of acrylic acid:acrylamide is from about 1:5 to 10:1.

4. The aqueous solution of claim 1 wherein the inorganic water soluble silicate is selected from the group consisting of metasilicate, orthosilicate, disilicate, mixed silicate, and aluminosilicate.

5. The aqueous solution of claim 4 wherein the metasilicate comprises $SiO_2$ and $Na_2O$.

6. The aqueous solution of claim 1 wherein the organofunctional silane is hydrolyzed aminopropyltrimethoxysilane.

7. The aqueous solution of claim 1 containing approximately 0.008% to 0.2% anionic acrylamide acrylic acid copolymer, approximately 0.005% to 0.12% inorganic water soluble silicate (expressed as $SiO_2$) and approximately 0.01% to 0.25% organofunctional silane.

8. The aqueous solution of claim 1 comprising an aqueous concentrate containing from about 0.8% to 2% anionic acrylamide acrylic acid copolymer, from about 0.5% to 1.2% nonorganic water soluble silicate and from about 1.0% to 2.5% organofunctional silane.

9. A method of coating a metal surface which comprises contacting the metal surface with an aqueous solution comprising an anionic acrylamide acrylic acid copolymer, an inorganic water soluble silicate and an organofunctional silane.

10. The method of claim 9 wherein the anionic acrylamide acrylic acid copolymer has a weight average molecular weight of from about 200 to 500,000.

11. The method of claim 9 wherein the anionic acrylamide acrylic acid copolymer consists of acrylic acid and acrylamide monomers wherein the molar ratio of acrylic acid:acrylamide is from about 1:5 to 10:1.

12. The method of claim 9 wherein the inorganic water soluble silicate is selected from the group consisting of metasilicate, orthosilicate, disilicate, mixed silicate and aluminosilicate.

13. The method of claim 12 wherein the metasilicate comprises $SiO_2$ and $Na_2O$.

14. The method of claim 9 wherein the organofunctional silane is hydrolyzed aminopropyltrimethoxysilane.

15. The method of claim 9 containing approximately 0.008% to 0.2% anionic acrylamide acrylic acid polymer, approximately 0.005% to 0.12% inorganic water soluble silicate (expressed as $SiO_2$) and approximately 0.01% to 0.25% organofunctional silane.

16. The method of claim 9 wherein the metal is selected from the group consisting of aluminum, steel, galvanized steel and zinc-aluminum coated steel.

17. The method of claim 9 wherein the aqueous solution is applied to the metal surface by spraying, dip-squeegee, flow coating or roll coating.

18. The method of claim 9 wherein the aqueous solution comprises an aqueous concentrate containing from about 0.8% to 2% anionic acrylamide acrylic acid copolymer, from about 0.5% to 1.2% inorganic water soluble silicate and from about 1.0% to 2.5% organofunctional silane.

* * * * *